United States Patent [19]

Suzuki et al.

[11] 4,400,072

[45] Aug. 23, 1983

[54] DIAPHRAGM DEVICE FOR A CAMERA WITH INTERCHANGEABLE LENSES

[75] Inventors: Ryoichi Suzuki, Kawasaki; Takashi Uchiyama, Yokohama, both of Japan

[73] Assignee: Canon Kabushiki Kaisha, Tokyo, Japan

[21] Appl. No.: 173,825

[22] Filed: Jul. 30, 1980

[30] Foreign Application Priority Data

Jul. 31, 1979 [JP] Japan .................. 54-97786

[51] Int. Cl.³ .................. G03B 7/08; G03B 9/56
[52] U.S. Cl. .................. 354/43; 354/23 D; 354/227; 354/266
[58] Field of Search .......... 354/23 D, 60 R, 227, 354/289, 266, 43

[56] References Cited

U.S. PATENT DOCUMENTS 4,054,890 10/1977 Shimomura .................. 354/227
4,104,649 8/1978 Tanaka et al. .................. 354/23 D
4,149,795 4/1979 Sakurada et al. .................. 354/60 L

FOREIGN PATENT DOCUMENTS 2620173 11/1977 Fed. Rep. of Germany ...... 354/227
2816861 10/1979 Fed. Rep. of Germany .

*Primary Examiner*—Russell E. Adams
*Attorney, Agent, or Firm*—Toren, McGeady & Stanger

[57] ABSTRACT

The present invention relates to a diaphragm device for a camera, particularly making use of the property of matter in such a manner that the light permeable characteristics of the matter is changed by applying the control signal to the matter so as to form a light shading part and a light permeable part in order to control aperture. In case of the above-mentioned diaphragm device, a matter having property is sandwiched between the first electrode member consisting of a plural number of the electrode plates and the second electrode member, whereby the control signal is selectively applied to certain determined electrode plates in accordance with the aperture signal in such a manner that only the part of the matter facing to the selected electrode plates assumes the light shading state so as to form the light shading part and the light permeable part so that the aperture is controlled by means of the ratio of the area of the light shading part to that of the light permeable part. Consequently, the diaphragm device making use of the property needs a plural number of electrode plates, whereby in case they are provided in the interchangeable lens it is necessary to transmit the aperture signal to the lens mounted on the camera, namely it is necessary to provide the same number of the connecting terminals as that of the electrode plates, which is inconvenient. Taking the above inconvenience into consideration, the present invention is intended to make the number of the connecting terminals between the interchangeable lens and the camera body as small as possible in case the interchangeable lens is provided with the above-mentioned diaphragm device.

8 Claims, 17 Drawing Figures

F I G. 1(a)
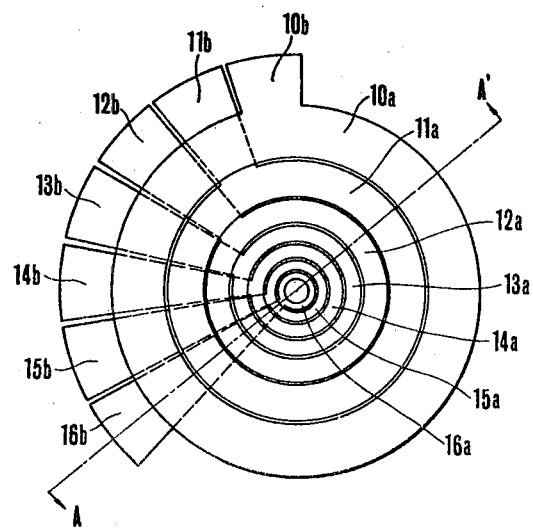
F I G. 1(b)
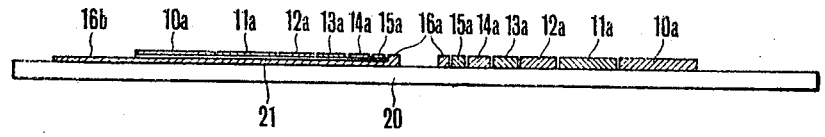

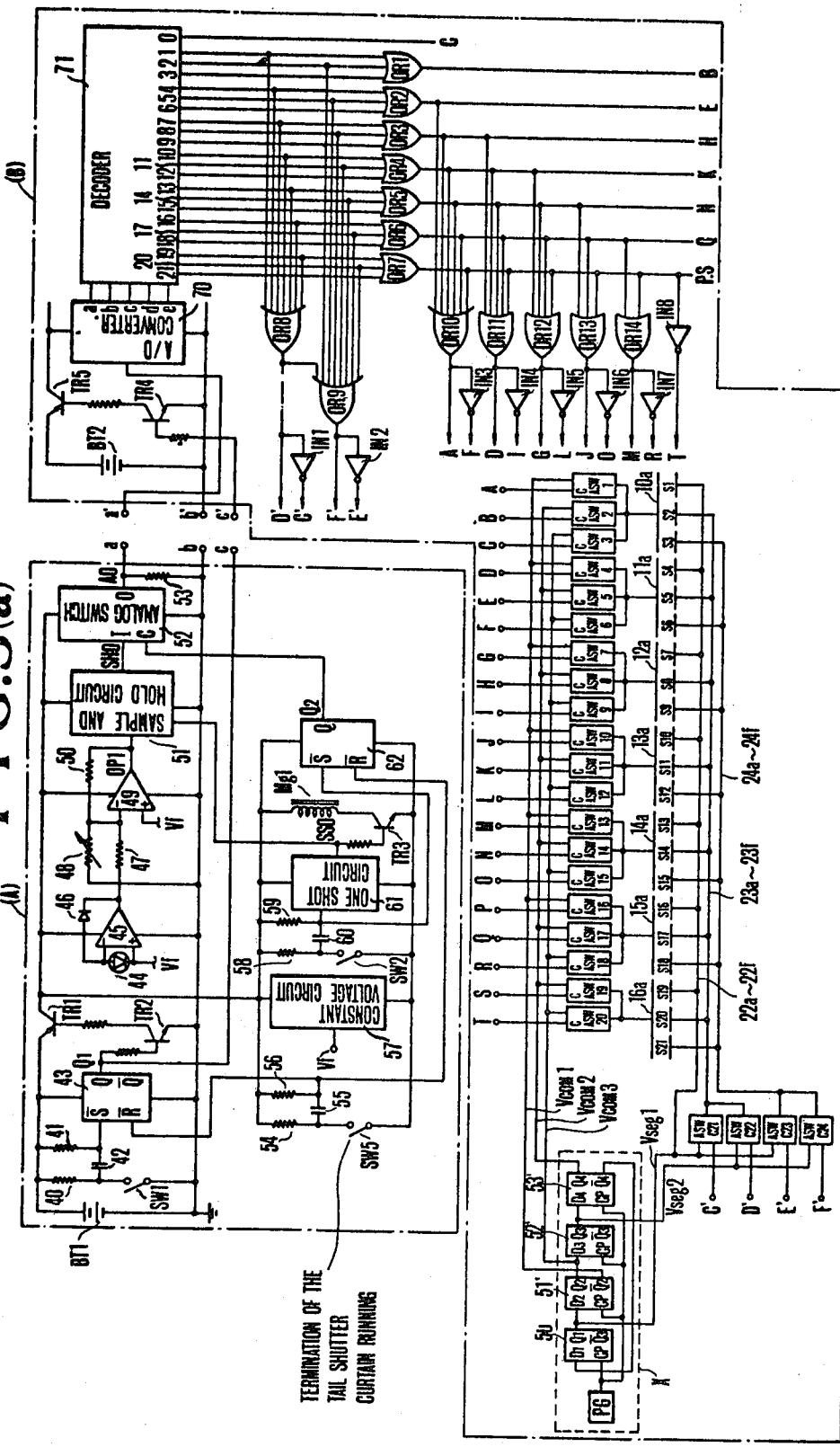

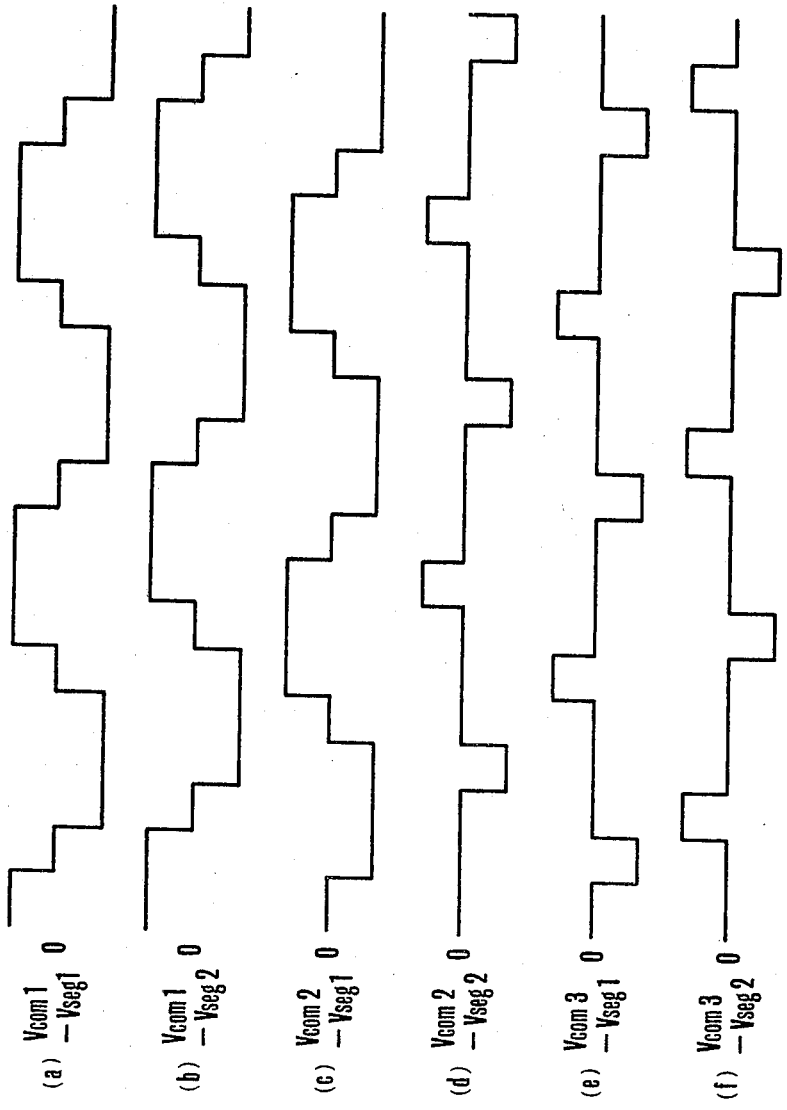

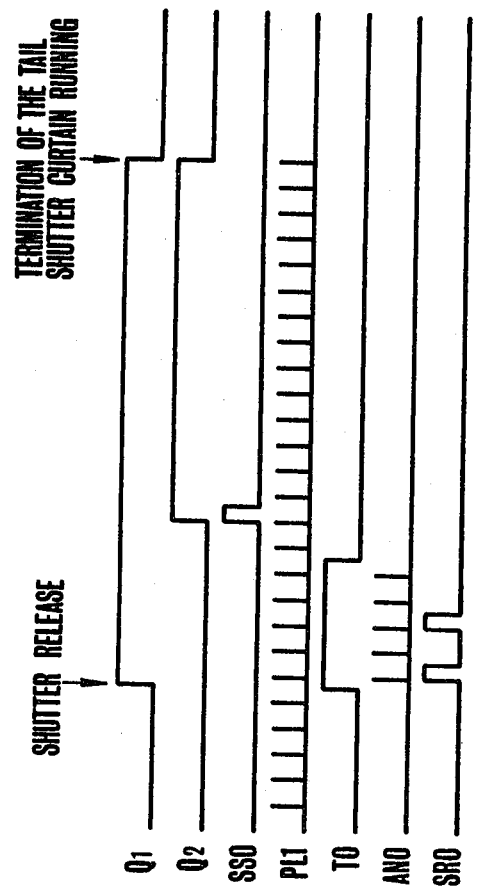

DIAPHRAGM DEVICE FOR A CAMERA WITH INTERCHANGEABLE LENSES

BACKGROUND OF THE INVENTION

1. Field of the Invention

The present invention relates to a camera system having the so-called diaphragm or shutter making use of the property of photoelectric or photomagnetic elements whose light permeability is varied in accordance with the applied electric or magnetic field, particularly a camera system in case the interchangeable lens for a camera is provided with the diaphragm or shutter making use of the property of matter.

2. Description of the Prior Art

Until now, the mechanical diaphragm device is mainly applied as diaphragm device for camera, the mechanical diaphragm device needs corresponding mechanism for operating the device. Thus, in case of a camera with the interchangeable lens it is necessary to provide a complicated mechanism for connecting the diaphragm device at the side of the interchangeable lens to the camera body, which causes the increase of the manufacturing cost, the size and the restriction of the freedom of the design of the camera.

The above-mentioned difficulties taken into consideration, various kinds of diaphragm device making use of the property of matter, namely the photoelectric and the photomagnetic element whose light permeability is varied in accordance with the applied electric or magnetic field have been proposed. As the above-mentioned photoelectric or photomagnetic element, the Kerr cell transparent ferroelectric substance (PLZT) having the double refraction, the liquid crystal and the Faraday element can be pointed out, whereby they are applied in combination with the polarizer and the analyzer. Apart from the above, the electrochromie element and the element having the electrophoresis are also known.

These diaphragm devices making use of the property of matter enjoy many features which the conventional mechanical diaphragm devices do not have. Namely, the diaphragm device making use of the property of matter do not need any connecting mechanism so that they are compact and light. The freedom of the camera design is largely increased. Further, quite free from the shock at the start of the diaphragm operation and the noise connected therewith, no undesirable feeling is given to the photographer. Further, the diaphragm closing confirmation operation can easily be made by means of only one switch. Further, the diaphragm making use of the property of matter can be operated at least by means of the electric circuit means, it can easily be adopted to the recent electronic camera, whereby there is much possibility for the diaphragm to make a large step toward the realization of the totally electronic camera in the future, which is quite profitable. It goes without saying that the conventional mechanical shutter can be replaced with the shutter making use of the property of matter in the same way as the diaphragm making use of the property of matter, which is also profitable.

Hereby, two kinds of the diaphragm making use of the property of matter can be thought out. The one is the light permeability control system in accordance to which the intensity of the electric or the magnetic field to be applied is controlled so as to control the light permeability in an analogue way, while the other is the area control system in accordance to which a plural number of the electrodes are arranged in the diaphragm device making use of the property of matter so as to vary the area in the light permeable state.

Further, in case of the former light permeability control system the delicate control is difficult in case the applied voltage—light permeability characteristics of the element is sharp, whereby further the applied voltage—light permeability characteristics itself has a temperature characteristics, which needs a temperature compensation so that the driving circuit is expensive.

Further, in case of this system it is necessary to apply voltage evenly to the whole element, so that the distance between the base plates between which the element is to be sandwiched has to be strictly constant, which gives much difficulty to the manufacture of cell.

Consequently, the latter area control system is much realizable. However, this system has also the following shortcoming.

The diaphragm making use of the property of matter of the area control system is driven by means of the digital signal, whereby in case the diaphragm making use of the property of matter is arranged in the interchangeable lens for camera, while the driving circuit is arranged at the side of the camera body, it is necessary to provide at least the same number of the contacts as that of the electrodes at the side of the camera body and the interchangeable lens.

Now, let the number of steps of the diaphragm making use of the property of matter be 7, each step having between steps of $\frac{1}{3}$. Hereby, at least 21 ($=3\times7$) electrodes is necessary, in case nothing is devised out. Thus, the same number of contacts as that of the electrodes are necessary, whereby it is almost impossible to provide such a large number of contacts at the lens mount.

SUMMARY OF THE INVENTION

The above-mentioned shortcomings, the present invention is characterized in the followings:

(1) The digital driving circuits including the A/D converter, the decoder, the driver and so on are provided at the side of the interchangeable lens, while the contacts for delivering the analogue signal corresponding to the aperture control information ($\Delta Av$) are provided at the side of the camera body and the contacts receiving the above analogue signal are provided at the side of the interchangeable lens.

(2) The shift register for carrying out the parallel to series conversion of the digital signal corresponding to the aperture control information ($\Delta Av$) and the contacts for delivering the output series signal of the above shift register are provided at the side of the camera body, while the contacts for receiving the above output series signal and the shift register for carrying out the series to parallel conversion are provided at the side of the interchangeable lens.

(3) A battery is provided at the side of the interchangeable lens so as to supply current to various circuits provided at the side of the interchangeable lens, or a battery is provided at the side of the camera body so as to supply current to various circuits provided at the side of the interchangeable lens through contacts.

Namely, a first object of the present invention is to reduce the number of the contacts, by delivering the aperture control information from the camera body to the interchangeable lens at least through a pair of contacts.

A second object of the present invention is supply current from the battery separately provided at the side of the interchangeable lens to various circuits necessarily provided at the side of the interchangeable lens in order to transmit the aperture control information at least by means of a pair of contacts.

A third object of the present invention is to supply current from the battery provided at the side of the camera body to the circuits provided at the side of the interchangeable lens through contacts.

BRIEF DESCRIPTION OF THE DRAWINGS

FIG. 1($a$) shows the construction of the electrodes provided on the one base plate of the diaphragm making use of the property of matter to be applied to the first embodiment of the present invention in plane view.

FIG. 1($b$) shows the section along the line A—A' of FIG. 1($a$).

FIG. 2($b$) shows the section along the line B—B' of FIG. 2($a$).

FIGS. 3($b$), ($c$) and ($d$) respectively show the timing chart of various signals for explaining the operation of the circuit shown in FIG. 3($a$).

FIG. 6($b$) shows the timing chart of various signals for explaining the operation of the circuit shown in FIG. 6($a$).

DESCRIPTION OF THE PREFERRED EMBODIMENTS

Figure 2A:
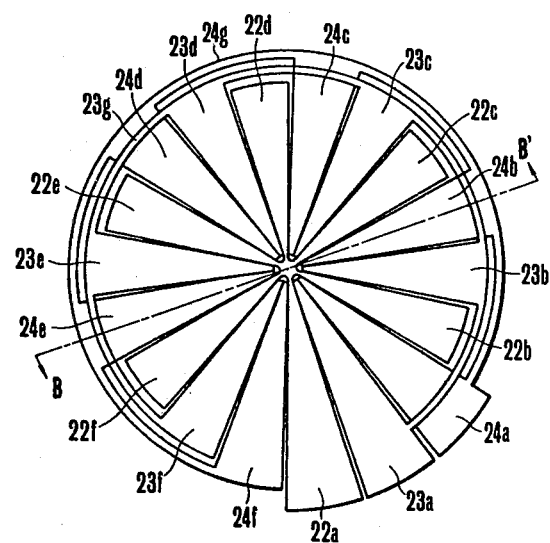
FIG. 2($a$) shows the construction of the electrodes provided on the other base plate of the diaphragm making use of the property of matter to be applied to the first embodiment of the present invention in plane view.
Figure 2B:
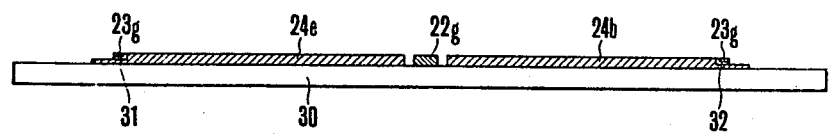

Below the present invention making use of liquid crystal as element of the property of matter will be explained in detail in accordance with the embodiments. The construction of the electrodes for the diaphragm making use of the property of matter to be used in the first embodiment is shown in FIGS. 1 and 2. FIG. 1($a$) shows the first divided transparent electrode group formed on the one transparent base plate of the diaphragm making use of liquid crystal as element of the property of matter in accordance with the present invention.

In the drawing, 10$a$–16$a$ are the doughnut-shaped electrodes, while 10$b$–16$b$ are their lead-out electrodes. They are insulated by means of the insulators from each other in such a manner that they do not come in electrical contact with each other at the position of the lead-out electrodes. FIG. 1($b$) shows the state in section along the line A—A' in FIG. 1($a$). In the drawing, 20 is the transparent base plate of the diaphragm making use of the property of matter, while 21 is the transparent insulation layer, which prevents the electrical contact between the lead-out electrode 16$b$ and the doughnut-shaped electrodes 10$a$–15$a$.

FIG. 2($a$) shows the second divided transparent electrode group formed on the other transparent base plate of the diaphragm making use of liquid crystal as element of the property of matter in accordance with the present invention. The second divided transparent electrode group consists of 18 fan-shaped electrodes, which is divided in 3 groups of 6 electrodes, whereby the electrodes in the same groups are electrically connected to each other. The fan-shaped electrodes 22$a$–22$f$ make one group, whereby they are electrically connected to each other through the central electrode 22$g$. The fan-shaped electrodes 23$a$–23$f$ also make one group, whereby they are electrically connected to each other through the circular electrode 23$g$. The fan-shaped electrodes 24$a$–24$f$ also make one group, whereby they are electrically connected to each other through the circular electrode 24$g$.

FIG. 2($b$) shows the section along the line B—B' in FIG. 2($a$).

In the drawing, 30 is the transparent base plate of the diaphragm making use of the property of matter, while 31 and 32 are the transparent insulation layers serving as the insulator between the fan-shaped electrodes 24$b$, 24$e$ and the circular electrode 23$g$. With reference to the diaphragm making use of the property of matter, a liquid crystal material is filled between the above both base plates and sandwiched between the polarizer and analyzer in case the liquid crystal material is of FETN type, in such a manner that the portion to which a voltage higher than a certain determined value is applied assumes the light shading state so as to act as diaphragm by means of the light modulation effect of the liquid crystal.

FIG. 3($a$) shows the circuit system of the first embodiment of the present invention. The construction of the present circuit system is as follows.

(1) The automatic exposure single lens reflex camera with priority on shutter time is thought of.

(2) The transmission of the aperture information from the camera body to the interchangeable lens is made with the analogue signal.

(3) A battery is separately provided at the side of the interchangeable lens so as to deliver the electrical power to the driving circuit provided at the side of the interchangeable lens.

(4) A switching means is provided between the battery separately provided at the side of the above interchangeable lens and the power supply circuit to the driving circuit, whereby the switching means is opened respectively closed in accordance with the power source latch signal at the side of the camera body.

In FIG. 3($a$), (A) is the circuit provided at the side of the camera body, while (B) is the one provided at the side of the interchangeable lens. In the circuit (A), BT1 is the power source battery provided at the side of the camera body, 40, 41 and 42 are resistances and a condenser for constituting the differentiating circuit, SW1 is the power source switch to be closed with the first stroke of the shutter button of the camera and 43 is the RS flip-flop circuit, whose set input is connected to the output of the above differentiating circuit (40, 41 and 42). TR2 is the switching transistor, whose base is connected to the Q output of the above RS flip-flop through a resistance. TR1 is the power supply switching transistor, whose base is connected to the collector of the above switching transistor TR2 through a resistance. 44 is the photovoltaic element (SPC) for making the TTL light measurement with the totally opened diaphragm and 45 is the operational amplifier constituting the SPC head amplifier, to whose both input terminals the above SPC 44 is connected, while the logarithmically compressing diode 46 is inserted in the feed back circuit. 49 is the operational amplifier for constituting an adder, to whose noninversing input the standard voltage level Vf is applied and to whose inversing input the output of the above operational amplifier 45 is connected through the resistance and also the negative power source is connected through the variable resistance 48 for setting the pre-set shutter time information and the ASA sensitivity information of the film to be used. 50 is the negative feed back resistance. 51 is the sample hold circuit, 52 is the analogue switch consisting for example of FET connected to the output of 51, and 53 is its load resistance. SW5 is the switch to be closed when the tail shutter curtain has run, and 54, 55 and 56 are resistances and a condenser for constituting a differentiating circuit, whose output is connected to the reset input of the above RS flip-flop circuit 43 and the reset input of the RS flip-flop circuit 62 to be explained later. 57 is a constant voltage circuit for producing the above standard voltage level Vf. 58, 59 and 60 are resistances and a condenser for constituting a differentiating circuit and 61 is a one shot multi-vibrator to be triggered with the negative differentiated pulse of the above differentiating circuit (58, 59, 60) so as to produce one pulse. TR3 is the switching transistor, whose base is connected to the output of the one shot multi-vibrator 61 through a resistance and to whose collector the magnet Mg1 for releasing the first holding is connected. 62 is the RS flip-flop circuit, whose set input is connected to the output of the above differentiating circuit (58, 59, 60) and whose reset input is connected to the output of the above differentiating circuit (54, 55, 56). Further, the Q output of the above RS flip-flop is connected to the control input of the above analogue switch 52.

a, b and c are respectively the output contact of the above analogue switch 52, the earth terminal contact and the Q output contact of the above RS flip-flop circuit 43. a', b' and c' are the contacts at the side of the interchangeable lens to be connected to a, b and c.

In the driving circuit B provided at the side of the interchangeable lens, BT2 is the power source battery provided at the side of the interchangeable lens and TR4 is the switching transistor, whose base terminal is connected to the above contact c' through a resistance. TR5 is the power supply switching transistor, whose base is connected to the collector of the above switching transistor TR4 through a resistance. 70 is the A/D converter, whose input is connected to the above contact a' so as to convert the input analogue signal into 5 bit binary signal. 71 is the decoder for converting the 5 bit binary input signal into decimal code. OR1–OR7 are 3 input OR gates, 3 inputs of each of which are respectively connected to the outputs 1–3, 4–6, 7–9, 10–12, 13–15, 16–18 and 19–21 of the above decoder 71. OR8 is the 7 input OR gate, whose inputs are connected to the outputs 1, 4, 7, 10, 13, 16 and 19 of the above decoder 71. OR9 is the 8 input OR gate, whose inputs are connected to the outputs 2, 5, 8, 11, 14, 17 and 20 of the above decoder 71 and to the output of the above OR gate OR8. OR10 is the 6 input OR gate, whose inputs are connected to the outputs of OR2–OR7. OR11 is the 5 input OR gate, whose inputs are connected to the outputs of OR3–OR7. OR12 is the 4 input OR gate, whose inputs are connected to the outputs of OR4–OR7. OR13 is the 3 input OR gate, whose inputs are connected to the outputs of the OR gates OR5–OR7. OR13 is the 2 input OR gate, whose inputs are connected to the outputs of OR6–OR7. IN1–IN8 are the inversing circuits respectively connected to the outputs of OR8–OR14 and OR7.

Now, let the 0 output of the decoder be C, the outputs of OR1–OR7 be B, E, H, K, N, Q and PS. Further, let the outputs of OR8–OR14 be D', P', A, D, G, J and M and the outputs of the inversing circuits IN1–IN8 be C', E', F, I, L, O, R and T. Table 1 shows the true values between the 5 bit outputs a, b, c, d, e of the A/D converter 70 and the above outputs A–T and C'–F'.

TABLE 1

|    | a | b | c | d | e | A | B | C | D | E | F | G | H | I | J | K | L | M | N | O | P | Q | R | S | T | C' | D' | E' | F' |
|----|---|---|---|---|---|---|---|---|---|---|---|---|---|---|---|---|---|---|---|---|---|---|---|---|---|----|----|----|----|
| 0  | 0 | 0 | 0 | 0 | 0 | 0 | 1 | 0 | 0 | 1 | 0 | 0 | 1 | 0 | 0 | 1 | 0 | 0 | 1 | 0 | 0 | 1 | 0 | 1 | 1 | 1  | 0  | 1  | 0  |
| 1  | 1 | 0 | 0 | 0 | 0 | 0 | 1 | 0 | 0 | 1 | 0 | 0 | 1 | 0 | 0 | 1 | 0 | 0 | 1 | 0 | 0 | 1 | 0 | 1 | 0 | 1  | 0  | 1  | 0  |
| 2  | 0 | 1 | 0 | 0 | 0 | 0 | 1 | 0 | 0 | 1 | 0 | 0 | 1 | 0 | 0 | 1 | 0 | 0 | 1 | 0 | 0 | 1 | 0 | 1 | 1 | 1  | 0  | 0  | 1  |
| 3  | 1 | 1 | 0 | 0 | 0 | 0 | 1 | 0 | 0 | 1 | 0 | 0 | 1 | 0 | 0 | 1 | 0 | 0 | 1 | 0 | 0 | 1 | 0 | 1 | 1 | 0  | 1  | 0  |
| 4  | 0 | 0 | 1 | 0 | 0 | 1 | 0 | 0 | 0 | 1 | 0 | 0 | 0 | 1 | 0 | 0 | 1 | 0 | 0 | 1 | 0 | 0 | 1 | 0 | 1 | 0 | 1  | 0  | 1  |
| 5  | 1 | 0 | 1 | 0 | 0 | 1 | 0 | 0 | 0 | 1 | 0 | 0 | 0 | 1 | 0 | 0 | 1 | 0 | 0 | 1 | 0 | 0 | 1 | 0 | 1 | 1 | 0  | 0  | 1  |
| 6  | 0 | 1 | 1 | 0 | 0 | 1 | 0 | 0 | 0 | 1 | 0 | 0 | 0 | 1 | 0 | 0 | 1 | 0 | 0 | 1 | 0 | 0 | 1 | 0 | 1 | 1 | 0  | 1  | 0  |
| 7  | 1 | 1 | 1 | 0 | 0 | 1 | 0 | 0 | 0 | 1 | 0 | 0 | 0 | 1 | 0 | 0 | 1 | 0 | 0 | 1 | 0 | 0 | 1 | 0 | 1 | 0 | 1  | 0  | 1  |
| 8  | 0 | 0 | 0 | 1 | 0 | 1 | 0 | 0 | 0 | 1 | 0 | 0 | 0 | 1 | 0 | 0 | 1 | 0 | 0 | 1 | 0 | 0 | 1 | 0 | 1 | 1 | 0  | 0  | 1  |
| 9  | 1 | 0 | 0 | 1 | 0 | 1 | 0 | 0 | 0 | 1 | 0 | 0 | 0 | 1 | 0 | 0 | 1 | 0 | 0 | 1 | 0 | 0 | 1 | 0 | 1 | 1 | 0  | 1  | 0  |
| 10 | 0 | 1 | 0 | 1 | 0 | 1 | 0 | 0 | 0 | 1 | 0 | 0 | 1 | 0 | 0 | 0 | 1 | 0 | 0 | 1 | 0 | 0 | 1 | 0 | 1 | 0 | 1  | 0  | 1  |
| 11 | 1 | 1 | 0 | 1 | 0 | 1 | 0 | 0 | 0 | 1 | 0 | 0 | 1 | 0 | 0 | 0 | 1 | 0 | 0 | 1 | 0 | 0 | 1 | 0 | 1 | 1 | 1  | 0  | 0  | 1  |
| 12 | 0 | 0 | 1 | 1 | 0 | 1 | 0 | 0 | 0 | 1 | 0 | 0 | 1 | 0 | 0 | 0 | 1 | 0 | 0 | 1 | 0 | 0 | 1 | 0 | 1 | 1 | 0  | 1  | 0  |
| 13 | 1 | 0 | 1 | 1 | 0 | 1 | 0 | 0 | 0 | 1 | 0 | 0 | 1 | 0 | 0 | 1 | 0 | 0 | 0 | 1 | 0 | 0 | 1 | 0 | 1 | 0 | 1  | 0  | 1  |
| 14 | 0 | 1 | 1 | 1 | 0 | 1 | 0 | 0 | 0 | 1 | 0 | 0 | 1 | 0 | 0 | 1 | 0 | 0 | 0 | 1 | 0 | 0 | 1 | 0 | 1 | 1 | 0  | 0  | 1  |
| 15 | 1 | 1 | 1 | 1 | 0 | 1 | 0 | 0 | 0 | 1 | 0 | 0 | 1 | 0 | 0 | 1 | 0 | 0 | 0 | 1 | 0 | 0 | 1 | 0 | 1 | 1 | 0  | 1  | 0  |
| 16 | 0 | 0 | 0 | 0 | 1 | 1 | 0 | 0 | 1 | 0 | 0 | 0 | 1 | 0 | 0 | 1 | 0 | 0 | 1 | 0 | 0 | 1 | 0 | 0 | 1 | 0 | 1  | 0  | 1  |
| 17 | 1 | 0 | 0 | 0 | 1 | 1 | 0 | 0 | 1 | 0 | 0 | 0 | 1 | 0 | 0 | 1 | 0 | 0 | 1 | 0 | 0 | 1 | 0 | 0 | 1 | 1 | 0  | 0  | 1  |
| 18 | 0 | 1 | 0 | 0 | 1 | 1 | 0 | 0 | 1 | 0 | 0 | 0 | 1 | 0 | 0 | 1 | 0 | 0 | 0 | 1 | 0 | 0 | 1 | 0 | 1 | 1 | 0  | 1  | 0  |
| 19 | 1 | 1 | 0 | 0 | 1 | 1 | 0 | 0 | 1 | 0 | 0 | 0 | 1 | 0 | 0 | 1 | 0 | 0 | 1 | 0 | 0 | 1 | 0 | 0 | 1 | 0 | 1  | 0  | 1  |
| 20 | 0 | 0 | 1 | 0 | 1 | 1 | 0 | 0 | 1 | 0 | 0 | 1 | 0 | 0 | 1 | 0 | 0 | 1 | 0 | 0 | 1 | 0 | 0 | 1 | 0 | 0  | 0  | 1  |

TABLE 1-continued

| | a | b | c | d | e | A | B | C | D | E | F | G | H | I | J | K | L | M | N | O | P | Q | R | S | T | C' | D' | E' | F' |
|---|---|---|---|---|---|---|---|---|---|---|---|---|---|---|---|---|---|---|---|---|---|---|---|---|---|---|---|---|---|
| 21 | 1 | 0 | 1 | 0 | 1 | 1 | 0 | 0 | 1 | 0 | 0 | 1 | 0 | 0 | 1 | 0 | 0 | 1 | 0 | 0 | 1 | 0 | 0 | 1 | 0 | 1 | 0 | 1 | 0 |

Figure 3B:
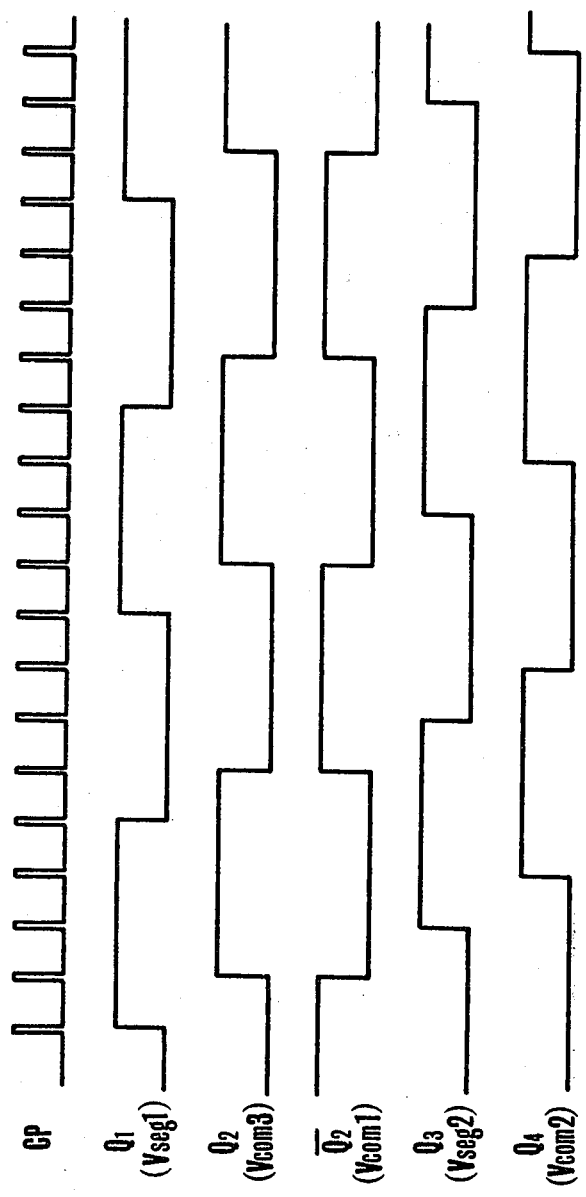
FIG. 3($a$) shows the circuit connection for the first embodiment of the camera system of the present invention.

Further, X is the pulse generating circuit for producing 4 pulse voltage whose phases shift by ⅛ from each other, PG is the pulse generator and 50'–53' are the D flip-flop circuits, the clock input of each of which is connected to the output of PG. Further, the Q outputs Q4, Q2 and Q3 of the D flip-flop circuits 50', 51' and 52' are respectively connected to the D inputs D2, D3 and D4 of the D flip-flop circuits 51', 52' and 53' of the next step, while the $\bar{Q}$ output $\bar{Q}4$ of the D flip-flop circuit 53' is connected to the D input D1 of the D flip-flop circuit 50'. The wave-form of the clock pulse CP from the pulse generator 50' and those of the output pulses from the output Q1, Q2, $\bar{Q}2$, Q3 and Q4 of each D flip-flop circuit are shown in FIG. 3(b). Now, let the output wave-forms of the outputs Q2, $\bar{Q}2$ and Q4 be $V_{COM3}$, $V_{COM1}$ and $V_{COM2}$ and the output wave-forms of the output Q1 and Q3 be Vseg1 and Vseg2.

ASW1–ASW20 makes an analogue switch group, whereby to the inputs of the analogue switches ASW1, ASW4, ASW7, ASW10, ASW13 and ASW16 the above pulse wave-form $V_{COM1}$ is delivered, while to the inputs of the analogue switches ASW2, ASW5, ASW8, ASW11, ASW13, ASW17 and ASW19 the above wave-form $V_{COM2}$ is delivered and to the inputs of the analogue switches ASW3, ASW6, ASW9, ASW12, ASW15, ASW18 and ASW20 the above wave-form $V_{COM3}$ is delivered. Further, to the control inputs of the analogue switches ASW1–ASW20 the above outputs A–T are respectively delivered. Further, all of the outputs of the analogue switches ASW1–ASW3 are connected to the ring-shaped transparent electrode 10a of the above diaphragm making use of the property of matter, all of the outputs of the analogue switches ASW4–ASW6 to the ring-shaped transparent electrode 11a, all of the outputs of the analogue switches ASW7–ASW9 to the ring-shaped electrode 12a, all of the analogue switches ASW10–ASW12 to the transparent electrode 13a, all of the analogue switches ASW13–ASW15 to the transparent electrode 14a, all of the outputs of the analogue switches ASW16–ASW18 to the transparent electrode 15a and the outputs of the analogue switches ASW19 and ASW20 to the transparent electrode 16a.

ASW21–ASW24 also make one analogue switch group, whereby the above wave-form Vseg1 is connected to the inputs of the analogue switches ASW21 and ASW23, while the above wave-form Vseg2 is connected to the inputs of the analogue switches ASW22 and ASW24. Further, the above outputs C'–F' are respectively connected to the analogue switches ASW21–ASW24. Further, the outputs of the analogue switches ASW21 and ASW22 are connected to the fan-shaped electrodes 23a–23f of the diaphragm making use of the property of matter, while the outputs of the analogue switches ASW23 and ASW24 are connected to the fan-shaped electrodes 24a–24f of the diaphragm making use of the property of matter. Further, the above pulse wave-form Vseg1 is normally applied to the fan-shaped electrodes 22a–22f of the above diaphragm making use of property.

FIG. 3(c) shows the voltage wave-forms of the above pulse wave-forms $V_{COM1}$–$V_{COM3}$ from which the above pulse wave-forms Vseg1 and Vseg2 are deducted. As is clear from the drawing, the effective values of the three upper pulse waves (A), (B) and (C) are larger than those of the three lower pulse waves (d), (e) and (f) in such a manner that the threshold value of the liquid crystal is between the above two effective value, namely between (A) (B) (C) and (d) (e) (f) the liquid crystal to which $V_{COM1}$ is applied is closed no matter whether the wave-form Vseg1 or Vseg2 is applied to the opposed electrodes, while the liquid crystal to which $V_{COM2}$ is applied is closed when the wave-form Vseg1 is applied to the opposed electrodes and opened when the wave-form Vseg2 is applied. Further, the liquid crystal to which $V_{COM3}$ is applied is opened no matter whether the wave-form Vseg1 or Vseg2 is applied to the opposed electrodes.

Below, the operation of the circuit constructed as above will be explained in accordance with the time chart in FIG. 3(d). Now, let the Q output of the flip-flop circuit 43 be Q1, the Q output of the RS flip-flop circuit 62 be Q2, the output of the one shot multi-vibrator 61 be SS0, the output of the operational amplifier 49 be OP1, the output of the sample and hold circuit 51 be SHO, and the output of the analogue switch 52 be AO.

With the first stroke of the shutter button the switch SW1 is closed, whereby the differentiating circuit (40, 41, 42) produces a negative differentiated pulse, by means of which pulse the RS flip-flop circuit 43 is set in such a manner that the level of the Q output Q1 is inversed in H, while the switching transistor TR2 in the next switching transistor TR2 is brought into the switched on state, so that the power supply switching transistor TR1 is also brought into the switched on state. Because the Q output Q1 of the above RS flip-flop circuit 43 is transmitted to the side of the interchangeable lens through the contacts C–C' in case the interchangeable lens is mounted on the camera body, along with the inversion of the level of the output Q1 into H, the switching transistor TR4 is also brought into the switched on state in such a manner that the power supply transistor TR5 is also brought into the switched on state, so that the power is supplied from the battery BT2 at the side of the interchangeable lens to the circuit at the side of the camera body.

With the above-mentioned current supply the SPC head amplifier 45 delivers an analogue voltage corresponding to Bvo (=APEX value of the object brightness information −'APEX value of the F value of the photographing lens) because the TTL light is incident upon the light measuring SPC44, which analogue value is calculated with the pre-set shutter time information Tv and the ASA sensitivity information Sv of the film by means of the operational amplifier 49 constituting the adder of the next step so as to produce an analogue voltage OP1 corresponding to the Appex value ΔAv of the number of steps for controlling the diaphragm.

Figure 3D:
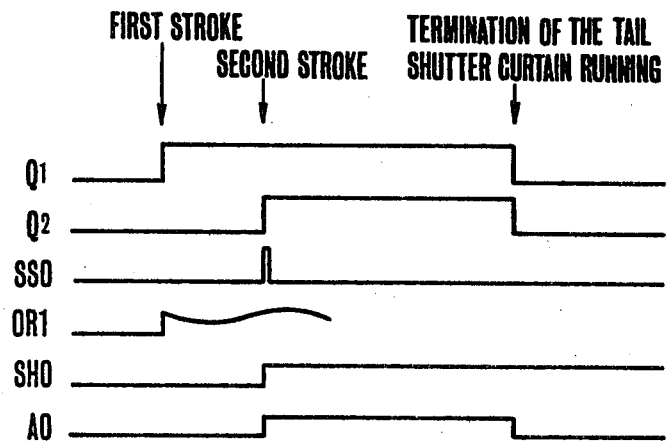

Then with the second stroke of the shutter button, the switch SW2 is closed, whereby the differentiating circuit (58, 59, 60) produces a negative differentiated pulse, by means of which pulse the one shot multi-vibrator 61 of the next step is triggered so as to deliver one pulse from the output SSO, as is shown in FIG. 3(d). During this one pulse the switching transistor TR3 is in the closed state so that a current is supplied to the magnet Mg1 for releasing the first holding, whereby the quick return mirror starts to go up. The one pulse delivered from the output SS0 of the one shot multi-vibrator is, as sample signal, to the sample and hold circuit 51, from whose output SHO the sampled and held voltage of the analogue output signal of the operational amplifier OP1 is delivered.

Further, by means of the negative differentiated pulse from the above differentiating circuit (58, 59, 60), the flip-flop circuit 62 is set, whereby the level of the Q output Q2 is inversed in H, so as to close the analogue switch 52, whose output delivers the held analogue signal of the output SHO of the above sample and hold circuit 51.

When the above quick return mirror has gone up, the leading shutter curtain starts to run and after the lapse of a certain determined time the tail shutter curtain starts to run by means of a tail shutter curtain control circuit, not shown in the drawing. When the tail shutter curtain has run, the switch SW5 is closed, whereby the differentiating circuit (54, 55, 56) produces a negative differentiated pulse, by means of which pulse the above RS flip-flop circuits 43 and 62 are reset, whereby the levels of the Q outputs Q4 and Q2 are inversed.

Along with this inversion of the level, the analogue switch 52 is opened, while the current supply switching transistors TR1 and TR5 are brought in the switched off state so as to interrupt the current supply to the circuits at the side of the camera body and that at the side of the interchangeable lens. Namely, from the release of the first holding till the tail shutter curtain has run the output AO of the analogue switch 52 delivers the hold analogue voltage corresponding to the aperture controlling step number information ΔAv. This held analogue voltage value corresponding to the object brightness just before the quick return mirror goes up. The analogue voltage corresponding to the held aperture controlling step number information ΔAv is applied to the A/D converter 70 in the circuit at the side of the interchangeable lens through the contacts a–a' so as to produce a 5 bit binary signal corresponding to the input analogue voltage.

Now, let us suppose the case that in accordance with the true value table of the sample and hold circuit 51 in Table 1, the output (a b c d e) of the analogue output voltage (ΔAv information) converted with the A/D converter 70 is [0 0 1 0 0], while only the level of the output 4 of the decoder is H. In this case, as is clear from the true value table in Table 1, only the levels of the outputs A, E, I, L, O R, T, D' and F' are H, while the levels of others are L. Thus, the analogue switches ASW1, ASW5, ASW9, ASW12, ASW15, ASW18, ASW20, ASW22 and ASW24 are closed, while other switches are opened. In this state to the ring-shaped transparent electrode 10a of the diaphragm making use of the property of matter the pulse wave-form $V_{COM1}$ is applied, to the ring-shaped transparent electrode 11a the pulse wave-form $V_{COM2}$ and to the ring-shaped transparent electrodes 12a–16a the pulse wave-form $V_{COM3}$. Further, to the fan-shaped electrodes 22a–22f of the diaphragm making use of the property of matter the pulse wave-form Vseg1 is normally applied to the fan-shaped electrodes 23a–23f the pulse wave-form Vseg2 and to the fan-shaped electrodes 24a–24f the pulse wave-form Vseg2.

Figure 4A:
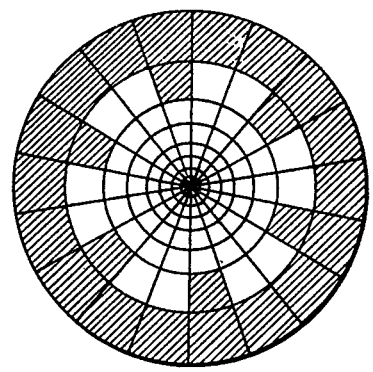
FIGS. 4($a$) and 4($b$) respectively show the closed state of the diaphragm making use of the property of matter of the first embodiment of the present invention.

Consequently, in this state, as is explained above, to the liquid crystals S1–S4 an alternating voltage whose effective value is higher than the threshold value of the liquid crystal is applied so as to be brought into the switched on state, while to the liquid crystals S'5–S'21 an alternating voltage whose effective value is lower than the threshold value of the liquid crystal is applied. FIG. 4(a) shows the closed state of the diaphragm making use of the property of matter. As is clear from the drawing, the diaphragm is closed by 1⅓ step.

Below, other cases than that at the time of the shutter operation (between the first stroke and the second stroke) will be explained. In this case, as is shown in the time chart shown in FIG. 3(d), the level of the output of the analogue switch is 0, so that the 5 bit output [a b c d e] of the A/D converter is [0 0 0 0 0] and therefore only the level of the 0 output (C) of the decoder 71 is H. Thus, as is clear from the true value table in Table 1, the levels of the outputs C, F, I, L, O R, T, C' and E' are H, while other levels are L. Thus, the analogue switches ASW3, ASW6, ASW9, ASW12, ASW15, ASW18, ASW20, ASW21 and ASW23 are closed, while other analogue switches are all opened. In this state, to all of the above ring-shaped transparent electrodes 10a–16a the above pulse form $V_{COM3}$ is applied, while to all of the above fan-shaped transparent electrodes 22a–22f, 23a–23f and 24a–24f the above pulse wave-form Vseg1 is applied. Consequently, as is explained in accordance with FIG. 3(c) all of the liquid crystals S1–S21 are brought in the switched off state, while the diaphragm making use of the property of matter becomes transparent all over the surface.

Figure 4B:
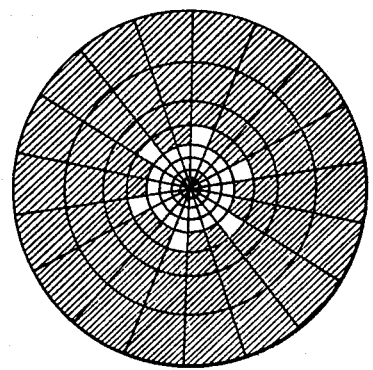

Below, let us consider the case the object brightness and so on changes and the analogue output voltage SHO (ΔAv information) of the sample and hold circuit 51 changes so that the A/D conversion output [a b c d e] of the A/D converter is [1 1 0 1 0]. In this case, as is clear from the true value table in Table 1, the levels of the outputs A, D, G, K, O, R, T, C' and F' are H, while other levels are L. Thus in this state, the analogue switch ASW1, ASW4, ASW7, ASW11, ASW15, ASW18, ASW20, ASW21 and ASW24 are closed, while other analogue switches are opened. In this state, to the ring-shaped transparent electrodes 10a–12a of the diaphragm making use of the property of matter the pulse wave-form $V_{COM1}$ is applied, and to the ring-shaped transparent electrodes 14a–16a, the pulse wave-form $V_{COM3}$. Further, to the fan-shaped electrodes 22a–22f of the diaphragm making use of the property of matter the pulse wave form Vseg1 is normally applied, to the fan-shaped electrodes 23a–23f the pulse wave-form Vseg1 and to the fan-shaped electrodes 24a–24f the pulse wave-form Vseg2. Thus, in this state, as is mentioned above, to the liquid crystals S1–S11 an alternating voltage whose effective value is higher than the threshold value of the liquid crystals is applied so as to bring the liquid crystals S1–S11 in the switched on state, while to the liquid crystals S12–S21 an alternating voltage whose effective value is lower than the threshold value of the liquid crystal is applied so as to bring the liquid crystals S12–S21 in the switched off state. FIG. 4(b) shows the closed state of the diaphragm making use of the property of matter. As is clear from the drawing, the diaphragm is closed by 3⅔ step.

Figure 5:
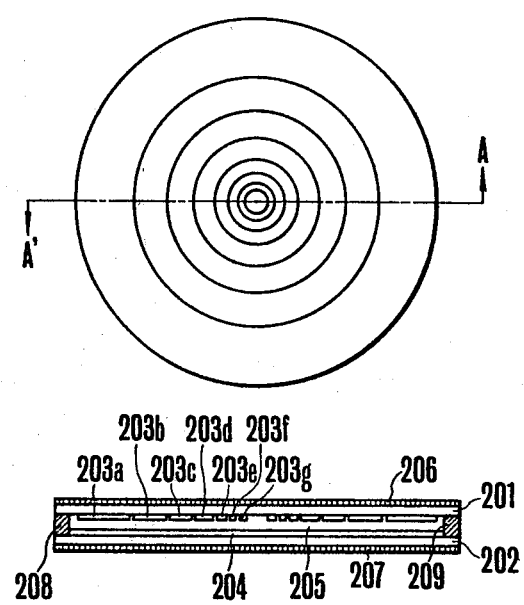
FIGS. 5($a$) and 5($b$) show the construction of the electrodes making use of the property of matter to be applied to the second embodiment of the present invention in plane view and the A—A' section.

FIG. 5 shows the construction of the electrodes for the diaphragm making use of the property of matter to be applied to the second embodiment.

In the drawing, 201 and 202 are the transparent glass base plates, 203a–203g are the circular or the doughnut-shaped divided transparent electrodes formed on the one transparent base plate 201 by vapour deposition and 204 is the common transparent electrodes formed on the other transparent base plate 202. 205 is the nematic liquid crystal sandwiched between the above both transparent base plates, whereby the nematic liquid crystal is orientated in twist mode. 208 and 209 are the separators for keeping the space between the above both transparent base plates 201 and 202 and at the same time preventing the leakage of the nematic liquid crystal material. 206 and 207 are the polarizers arranged on the outsides of the above transparent base plates in such a manner that the polarization directions of 206 and 207 are shifted by 90° from each other.

The nematic liquid crystal orientated in first mode has the polarization efficiency to rotate the polarization direction of the polarized incident light by 90° when no voltage is applied, so that the polarization direction of the polarized light passing through the polarizer 206 is rotated while it passes through the nematic liquid crystal 205 so that it can pass through the polarizer 207. Thus, the diaphragm making use of the property of matter assumes the transparent state when no voltage is applied.

When an alternating voltage is applied between a selected divided transparent electrode and the common transparent electrode, the orientation of the twist mode of the nematic liquid crystal between the electrodes is destroyed in such a manner that the polarization efficiency is no more. Thus, the polarized light incident upon the nematic liquid crystal is not rotated in the polarization direction so as to pass through the nematic liquid crystal and be interrupted with the next polarizer 207. Namely, the diaphragm making use of the property of matter assumes the light shading state when a voltage is applied. By means of applying an alternating voltage by properly selecting the above divided transparent electrodes in accordance with the aperture value at the side of the camera the desired aperture value can be obtained.

Hereby, the number of the divided transparent electrodes of the diaphragm making use of the property of matter shown in FIG. 5 is 7, whereby it is easily possible to increase the number of the divided electrodes so as to obtain a between-step.

In case of the present embodiment, the above divided transparent electrodes are further divided so as to obtain a between-step of ⅓ for 7 aperture controls, namely altogether 21 step (3×7).

Figure 6A:
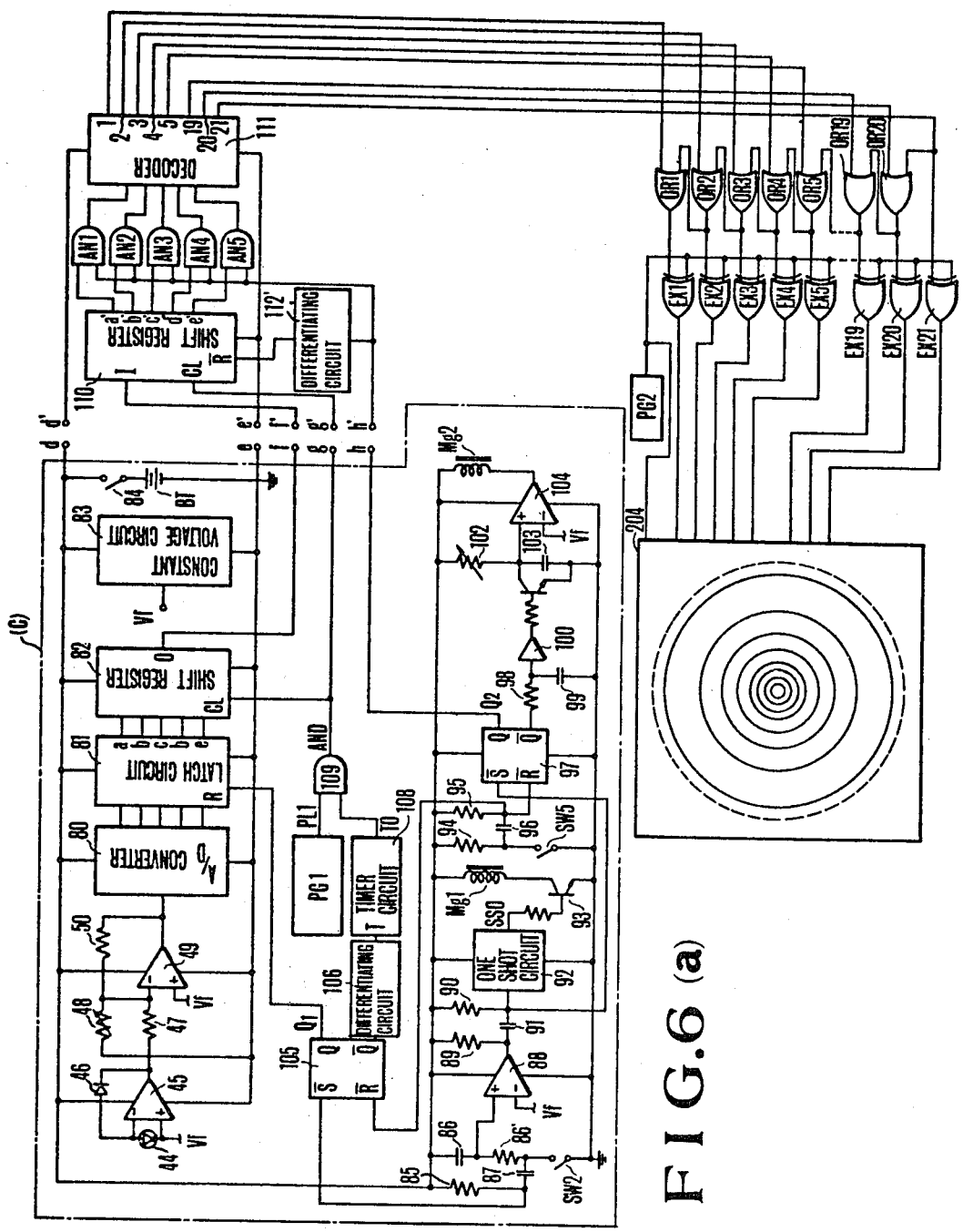
FIG. 6($a$) shows the circuit connection of the second embodiment of the camera system of the present invention.

FIG. 6(a) shows the circuit system for the second embodiment. The specification of the present circuit system is as follows:

(1) The automatic exposure single lens reflex camera with priority on shutter time is considered.
(2) The transmission of the aperture information from the side of the camera body to the side of the interchangeable lens is made by means of the time serial digital signal.
(3) The power is supplied from the battery at the side of the camera to the driving circuit provided at the side of the interchangeable lens through contacts. The members having the same figures as those in FIG. 3 are the same members.

In the drawing, 44 is the photovoltaic element (SPC) for measuring the TTL light with totally opened diaphragm and 45 is the operational amplifier for constituting the SPC head amplifier, to whose both input terminals the above SPC is connected and in whose feed back circuit the logarithmically compressing diode 46 is arranged. 47–50 are the calculation circuits shown also in FIG. 3(a) for calculating the object brightness information (Bvo) from the SPC head amplifier 45 with the pre-set shutter time information (Tv) and the ASA sensitivity information (Sv) of the film to be used so as to produce an analogue voltage corresponding to the diaphragm control step number (ΔAv). 80 is the A/D converter for converting the input analogue voltage into 5 bit binary signal. 81 is the latch circuit for latching the input 5 bit binary signal when the level of the input to the latch terminal R is H. 32 is the shift register so designed that every time a shift pulse is applied to the clock input CL, the input 5 bit binary signal is converted, in a way of parallel to series, into a time serial signal. 83 is the constant voltage producing circuit, whose output voltage Vf serves as standard level for the above operational amplifiers 45 and 49. BT is the power source provided at the side of the camera body, while 84 is the main switch of the camera.

85 and 87 are the resistance and the condenser for constituting the differentiating circuit and 86 and 86' are the condenser and the resistance for constituting the time constant circuit for delay. 88 is the operational amplifier for constituting the comparison circuit, whose non-inversing input is connected to the connecting point of the condenser 86 and the resistance 86' and to whose inversing input the output Vf of the above constant voltage producing circuit 33 is applied.

89, 90 and 91 are the resistances and the condenser for constituting the differentiating circuit, 92 is the one shot multi-vibrator connected to the output of the differentiating circuit and 93 is the switching transistor, whose base is connected to the output of the above one shot multi-vibrator 92 through the resistance and to whose collector the magnet Mg1 for releasing the first holding is connected. 94, 95 and 96 are the resistances and the condenser for constituting the differentiating circuit, SW5 is the switch to be closed when the tail shutter curtain has run, and 97 is the RS flip-flop circuit whose set input is connected to the output of the above differentiating circuit (89, 90, 91) and whose reset input is connected to the output of the above differentiating circuit (94, 95, 96).

98 and 99 are the resistance and the condenser for constituting a time constant circuit for delay, to whose connecting circuit the buffer circuit 100 is connected. 102 is the resistance for setting the preset shutter time information (Tv), 103 is the time deforming condenser and 101 is the switching transistor connected in parallel to the condenser 103, the base of which switching transistor is connected to the output of the above buffer circuit 100 through a resistance. 104 is the operational amplifier constituting a comparator, where non-inversing circuit is connected to the connecting point between the above variable resistance 102 and the condenser 103 and to whose inversing input the standard voltage level Vf is applied. Mg2 is the tail shutter curtain control magnet connected to the output of the operational amplifier 104. 105 is the RS flip-flop circuit, whose set input is connected to the output of the above differentiating circuit (85 and 87) and whose reset input is connected to the output of the above differentiating circuit (94, 95, 96). 106 is the differentiating circuit connected to the $\overline{Q}$ output of the flip-flop circuit 105 so as to produce a negative differentiated pulse when the level of the $\overline{Q}$ output is inversed from H to L. 108 is the timer circuit to be triggered by means of the negative differentiated pulse, whereby the H level is held for a certain determined period when the timer circuit is once triggered. PG1 is the pulse generating circuit, while 109 is the 2 input AND gate, whose one input is connected to the output PG1 of the above pulse generating circuit and whose other input is connected to the output of the above timer circuit 108. The output of the AND gate 109 is connected to the clock input CL of the above shift register 82. The circuit (C) at the side of the camera body is constituted in this way. d–h are the contacts provided on the lens mount part at the side of the camera body, whereby the contact d is connected to the positive terminal of the power source BT through the main source switch 84 of the camera, the contact e to the negative terminal of the power source BT, the contact f to the output of the above shift register 82, the contact g to the output of the AND gate 109 and the contact h to the Q output of the above RS flip-flop circuit 97. d'–h' are the contacts arranged at the side of the interchangeable lens, whereby they are connected electrically to the contacts d–h at the side of the above camera body when the interchangeable lens is mounted on the camera body.

Below, the construction of the circuit provided at the side of the interchangeable lens will be explained. 110 is the shift register for the series to parallel conversion, whose input is connected to the above contact f' and whose clock input CL is connected to the contact g'. AN1–AN5 are the 2 input gates, whose one input is connected to the 5 bit output of the above shift register 110 and whose other input is connected to the above contact h'. 111 is the decoder, whose input is connected to the output of the AND gates AN1–AN5 so as to convert the input 5 bit binary signal into decimal code. OR1–OR20 are the 2 input OR gates, whose one inputs are connected to the outputs 1–20 of the above decoders. The other inputs of OR1–OR19 are connected to the outputs of OR2–OR20, while the other input of R20 is connected to the output 21 of the above decoder 111. EX1–EX20 are the exclusive OR gates, whereby the one inputs of EX1–EX20 are connected to the outputs of the above OR gates OR1–OR20, while the one input of EX21 is connected to the output of the above decoder. PG2 is the pulse generating circuit, whose output is connected to the other inputs of the exclusive OR gates X1–X21 and also to the common electrode 204 of the diaphragm making use of the property of matter shown in FIG. 5. Further, the outputs of the above exclusive OR gates EX1–EX21 are connected to the divided transparent electrodes of the diaphragm making use of the property of matter.

The operation of the circuit constructed as mentioned above will be explained in accordance with the time chart shown in FIG. 6(b). Hereby, let the Q outputs of the RS flip-flip circuit 105 and 97 be Q1 and Q2, the output of the one shot multi-vibrator 92 SS0, the output of the pulse generating circuit PG1, PL1, the output of the timer circuit 108 To, the output of the AND gate 109 ANO and the output of the shift register 82 SRO.

When along with the closing of the main switch 84 of the camera the shutter release operation is carried out, the switch SW2 is closed and the differentiating circuit (85, 87) produces a negative differentiated pulse, by means of which pulse the RS flip-flop circuit 105 is set, whereby the level of the Q output Q1 is inversed in H, while that of the $\bar{Q}$ output is inversed into L. With the inversion of the level of this Q output Q1 into H the latch circuit 81 latches the 5 bit output signal of the A/D converter 80. Now, let the state of the output [a b c d e] be [0 0 1 0 0]. From the output PL1 of the pulse generating circuit PG1, the pulse as is shown in FIG. 6(b) is delivered, whereby while the level of the output To of the timer circuit 108 is being H the AND gate 109 is opened in such a manner that 5 pulses are delivered at the output ANO. These pulses are delivered to the clock inputs of the above shift register 82 and 110 as shift pulses, whereby from the output of the shift register 82 a pulse series converted into time serial signal of the input [0 0 1 0 0] is delivered. The pulse series is delivered to the shift register 110 at the side of the interchangeable lens so as to be converted in series to parallel way in such a manner that the last of the five shift pulses is produced the state of the output (a', b', c', d', e') becomes [0 0 1 0 0], whereby the transmission of the content of the shift register 82 is completed.

When with the above mentioned shutter release the switch SW2 is closed, the condenser 86 starts to be charged through the resistance 86 until the charge voltage reaches a certain determined value, when the level of the non-inversed input of the operational amplifier 80 becomes lower than that of the inversed input in such a manner that after the lapse of a certain determined time after the shutter release the level of the output of the operational amplifier 88 is inversed into L. Thus, from the output of the differentiating circuit (89, 90, 91) a negative differentiated pulse is delivered so as to trigger the one shot multi-vibrator 92 of the next step, whereby one pulse is delivered from the output SS0. During the period of this one pulse the switching transistor 93 is in the closed state so as to supply current to the magnet Mg1 for releasing the first holding in order to cause the upward motion of the quick return mirror. Further, by means of the negative differentiated pulse from the above differentiating circuit (89, 90, 91) the RS flip-flop circuit 97 is set, whereby the level of the Q output Q2 is inversed in H, while that of the $\bar{Q}$ output is inversed into L. Hereby, the values of the condenser 86 and the resistance 86' for constituting the above time constant circuit is adjusted in such a manner that the level of the Q output Q2 of the RS flip-flop circuit 97 is inverted into H only after the transmission of the digital signal from the shift transistor 82 to the shift transistor 110 has been completed. With the inversion of the level of the Q output Q2 of the flip-flop circuit 97 into H, the AND gates AN1–AN5 at the side of the interchangeable lens are opened so as to deliver the binary signal [0 0 1 0 0] of the output [a', b', c', d', e'9 of the above shift register 110. Thus, the level of the output 4 corresponding to the input binary signal [0 0 1 0 0] out of the outputs of the decoder becomes H, while other levels remain L in such a manner that the level of the one input of the OR gate OR4 becomes H and the level of the output becomes H. In the same way, the levels of the outputs of the OR gates OR2, OR1 become H. Thus, from the exclusive OR gates EX1–EX4, the pulses whose phases are inversed to that of the output pulse from the pulse generating circuit PG2, while from EX5–EX21 the pulses whose phases are same as that of the output pulse from the pulse generating circuit PG2. In this state only the part connected to the exclusive OR gates EX1–EX4, of the diaphragm making use of the property of matter assumes the light shading state (diaphragm closing by 1⅓ step).

With the inversion of the level of the $\bar{Q}$ output of the above flip-flop circuit 97, the condenser 99 discharges through the resistance 98 in such a manner that the discharge level reaches a certain determined value after the lapse of a certain determined value, whereby the level of the output of the buffer circuit 100 is also inversed in L. Thus, the switching transistor 101 is opened, whereby the time constant condenser 103 starts to be charged through the variable resistance 102 for setting the pre-set shutter time. When after the lapse of a certain determined time, the charge level reaches a certain determined value, the level of the non-inversing input of the operational amplifier 104 becomes higher than that of the inversing input, whereby the level of the output of the operational amplifier 104 is inversed in H and the current supply to the magnet Mg2 for controlling the tail shutter curtain is interrupted so as to allow the tail shutter curtain to start to run. When the tail shutter curtain has run, the switch SW5 is closed, whereby the differentiating circuit (94, 95, 96) produces a negative differentiated pulse, by means of which pulse the RS flip-flop circuits 105 and 97 are reset, whereby the levels of the Q outputs Q1 and Q2 are inversed in L. With the inversion of the level of the Q2 output into L, the AND gates AN1-AN5 are closed, whereby all the level of their outputs are inversed into L, so that all the levels of the outputs of the decoder 111 are inversed into L, while all the levels of the outputs of the OR gates OR1-OR20 are inversed into L. Thus, the phases of the output pulses of the exclusive OR gates EX1-EX21 are same as that of the output pulse of the pulse generating circuit PG. Thus, the diaphragm 112 making use of the property of matter is brought to be in the switched off state all over the surface so as to assume the totally transparent state. Further, with the inversion of the level of the Q output Q2 of the above RS flip-flop circuit 97 into L the differentiating circuit 112' at the side of the interchangeable lens produces a negative differentiated pulse, by means of which pulse the shift register 110 is reset, clearing the content of each bit.

Thus, in case of the second embodiment, the binary signal of the step number information ($\Delta$Av) of the diaphragm to be control during a short period is transferred from the shift register at the side of the camera body to the shift register at the side of the interchangeable lens as time serial signal after the shutter release operation is carried out, whereby after the signal transmission has been completed the diaphragm closing operation is carried out. Further, the shutter operation is carried out, after the binary signal has been transmitted.

Figure 7:
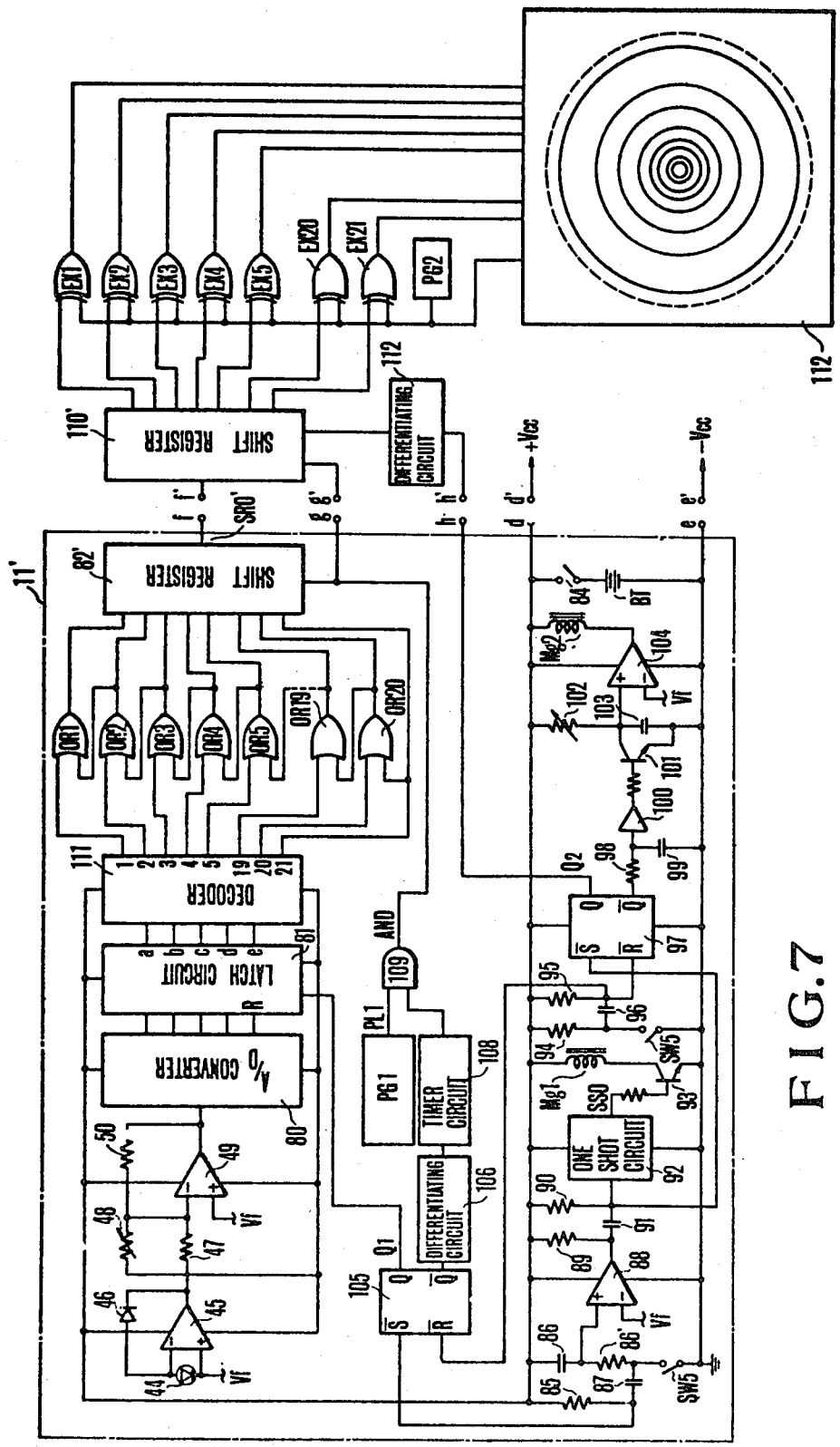
FIG. 7 shows the circuit connection of the third embodiment of the camera system of the present invention.

The circuit system of the third embodiment is shown in FIG. 7. The present embodiment is an improvement of the second embodiment, whereby in order to reduce the manufacturing cost of the interchangeable lens the circuit to be provided at the side of the interchangeable lens is made as small as possible.

In the circuit system shown in FIG. 7, the decoder 111 and the OR gates OR1-OR20 are provided at the side of the camera body, while the AND gates AN1-AN5 are eliminated so as to make the circuit at the side of the interchangeable lens as small as possible.

In the drawings, the members having the same figures as those in FIG. 6(a) are the same members, so that their explanation is omitted here. 82' is the shift register for parallel to series conversion, to whose input the 21 bit digital signal of the output 21 of the OR gates OR1-OR20 and the decoder 111 is delivered. Further, the clock input of the shift register 82' is connected to the output AN0 of the above AND gate 109. 110' is the shift register provided at the side of the interchangeable lens for series to parallel conversion, whose 21 bit output is connected to the one input of the exclusive OR gates EX1-EX21.

Below the operation of the present circuit will be explained. When the output AN0 of the AND gate 109 delivers a shift pulse, the shift register 82' converts the input 21 bit binary signal into time serial signal. (In case of the present circuit, the timer time of the timer circuit 108 is so adjusted that 21 shift pulses are delivered from the output AN0 of the AND gate.) The above time serial signal is transmitted to the shift register 110' at the side of the interchangeable lens through the contacts f-f', whereby the transmission is completed with the last of the above 21 shift pulses. Consequently, in case now only the level of the output 4 of the decoder 11 are H, the levels of the outputs of the OR gates OR1-OR4 are H, while those of the outputs of the OR gates OR-5-OR20 are L, so that at the time point at which the above time serial signal has been transmitted the 21 bit output of the shift register 110' is [1 1 1 1 0 0 ... 0], in which state the diaphragm is closed by 1⅓ step as is also explained in accordance with FIG. 6(a).

When the level of the Q output Q2 of the RS flip-flop circuit 97 becomes L after the tail shutter curtain has run, the differentiating circuit 112' at the side of the interchangeable lens produces a negative differentiated pulse, by means of which pulse the shift register 110' is reset, whereby the level of the 21 bit output becomes L. Thus, the diaphragm 112 making use of the property of matter assumes the totally transparent state.

Figure 8:
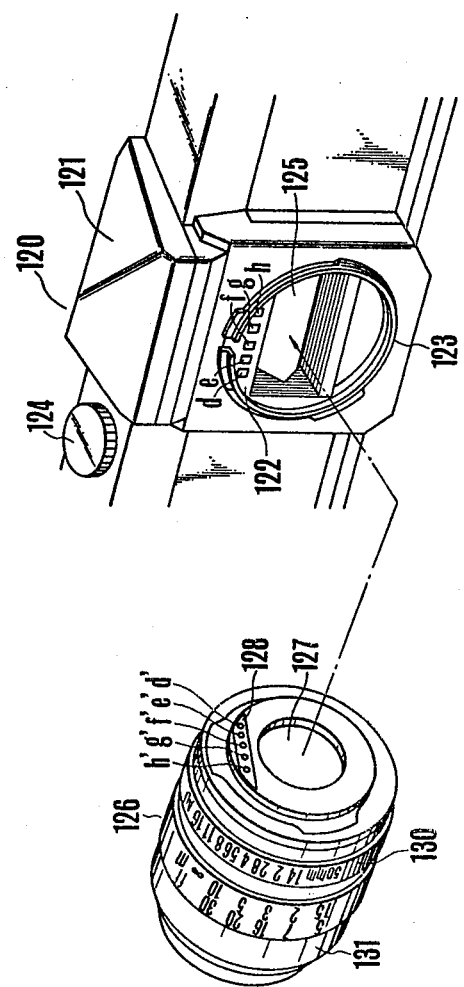
FIG. 8 shows the important parts of the interchangeable lens and the camera body of the camera system of the present invention in perspective view.

FIG. 8 shows an example of the arrangement of the above contacts. In the drawing, 120 is the camera body, 121 is the pentagonal prism cover, and 122 is the insulation plate, on which the contacts d-h at the side of the camera body are provided. 123 is the bayonet mount, 124 is the shutter time preset dial and 125 is the quick return mirror. 126 is the interchangeable lens, 127 is the photographing lens, and 128 is the insulation plate, on which the contacts d'-h' at the side of the interchangeable lens are arranged. 130 is the preset aperture ring and 131 is the distance ring. When the interchangeable lens 126 is mounted on the camera body 120, the above contacts d-h are electrically connected to the above contacts d'-h'. Hereby, the contacts e and e' are the earth terminals. Instead of separately providing the contacts e and e', the camera body and the interchangeable lens body can be made use of as earth terminals.

So far only the automatic exposure camera with priority on shutter time are related to, whereby the present invention is not limited to those.

Figure 9:
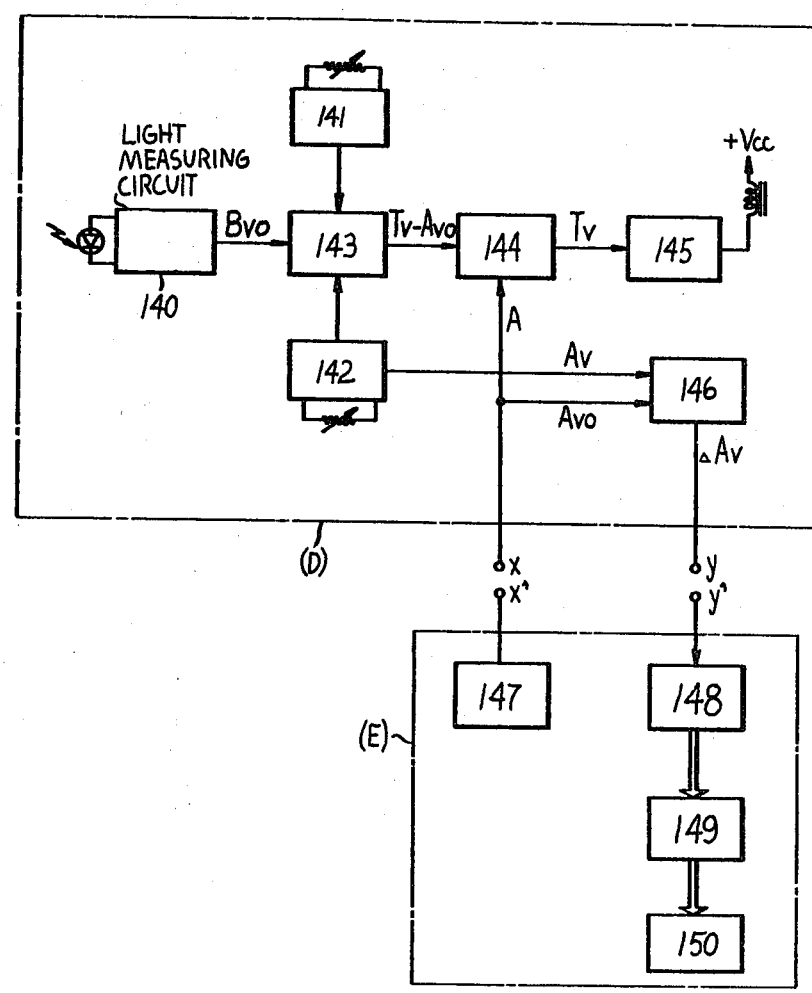
FIG. 9 shows the block circuit diagram of the AE camera with priority on aperture of the fourth embodiment of the camera system of the present invention.

FIG. 9 shows the outline of the circuit composition applied to the automatic exposure single lens reflex camera with priority on aperture value of dial input system in accordance with the present invention. In the drawing, (D) is the circuit at the side of the camera body and (E) is the circuit at the side of the interchangeable lens. In the circuit (D) at the side of the camera body, 140 is the light measuring circuit of TTL system, so that from the output the analogue signal corresponding to the Bvo information (=Bv−Avo) is delivered. 141 is the Sv information producing circuit for producing an analogue signal corresponding to the ASA sensitivity information Sv of the film, 142 is the Av information producing circuit for producing an analogue signal corresponding to the preset aperture value information Av and 143 is the calculating circuit for calculating the Bvo, the Sv and the Av information so as to produce an analogue signal corresponding to (Tv-Avo) information. This Avo represents the APEX value of the F value of the lens. 144 is also the calculating circuit for calculating the input (Tv–Avo) information and the Avo information so as to produce an analogue signal corresponding to the shutter time information Tv. 145 is the storage and tail shutter curtain control circuit for controlling the starting time of the tail shutter curtain in accordance with the input Tv information. 146 is the calculating circuit for calculating the input Av information and the Avo information so as to produce an analogue signal corresponding to the diaphragm closing step number information ΔAv. 147 is the Avo, information producing circuit for producing an analogue signal corresponding to the F value information of the lens, whereby the output is connected to the calculating circuit 144 and 146 at the side of the camera body through the contact X—X'. 148 is the A/D converter, to whose input the output of the calculating circuit 146 at the side of the camera body is connected through the contacts Y—Y'. 149 is the decoder driver and 150 is the diaphragm device making use of the property of matter. Hereby, it is also possible to provide the calculating circuit 146 at the side of the interchangeable lens.

As has been explained so far in detail, in accordance with the present invention, the transmission of the aperture information from the side of the camera body to the side of the interchangeable lens is carried out by means of a pair of the electrical contacts so that the number of the contacts can remarkably reduced even when a diaphragm making use of the property of matter with area control system is used at the side of the interchangeable lens, which is quite efficient in practice.

What is claimed is:

1. A camera system comprising:
   (A) a camera body including:
   (a) a light measuring circuit for producing an output corresponding to the brightness of an object;
   (b) a shutter release operation member;
   (c) power supply means for supplying power to the light measuring circuit in response to a first step in a stroke of the release operation member;
   (d) an external terminal for transmitting a voltage from the camera body;
   (e) switching means for sending the voltage to the external terminal in response to a second step in the stroke of the release operation member; and
   (B) a lens barrel couplable to the camera body and including:
   (a) an external terminal to be connected to the external terminal of the camera when the lens barrel is coupled with the camera body;
   (b) an analogue-digital converting circuit for converting the voltage input through the external terminal into a digital signal; and
   (c) a diaphragm device having a solid state member and a plurality of electrode members, said solid state member being arranged for changing light shading characteristics when an electric signal is applied to the electrode members,
   said diaphragm device further comprising a selecting circuit for selecting the electrode members on the basis of a digital signal from the analogue-digital converting circuit and applying the electrical signal to the selected electrode members, so that the solid state member changes the light shading characteristics of a portion corresponding to the digital signal to restrict the diaphragm aperture in correspondence to the digital signal.

2. A camera system comprising:
   (A) a camera body including:
   (a) an aperture information forming circuit, said circuit forming an analogue signal representing an aperture value;
   (b) an A-D converting circuit for converting the analogue signal to a digital value;
   (c) a first shift register for storing the output of the A-D converting circuit;
   (d) an output control circuit for delivering the output of the A-D converting circuit stored in the first shift register serially in response to a release operation;
   (e) an external terminal for transmitting the signal serially delivered from the first shift register out of the camera body;
   (f) a control circuit actuated by the release operation for producing a control signal after completion of transmission of the signal from the first shift register out of the camera body; and
   (B) a lens barrel couplable to the camera body and including:
   (a) an external terminal to be connected to the external terminal of the camera when the lens barrel is coupled to the camera body;
   (b) a second shift register for converting the signal serially applied through the external terminal into a parallel signal;
   (b) a diaphragm device having a solid state member and a plurality of electrode members, said solid state member being arranged for changing light shading characteristics when an electrical signal is applied to the electrode members,
   said diaphragm device further comprising a selecting circuit for selecting predetermined electrode members in accordance with the second shift register so as to apply the electrical signal to the selected electrode members; and
   (d) means for making the diaphragm device operative in response to the control signal from the control circuit.

3. A camera system for controlling the aperture value of the lens by transmitting the aperture signal from the camera body to the mounted lens comprising:
   (A) a camera body including:
   (a) an aperture information signal forming circuit, said circuit forming an electrical analogue signal corresponding to the aperture value;
   (b) an A-D converter for converting the analogue signal to a digital value;
   (c) latch means for latching an output of the A-D converter by a release operation;
   (d) a parallel-series converting circuit for delivering a parallel digital value latched by the latch means serially in response to the release operation;
   (e) a terminal to be connected to the output terminal of the parallel-series converting circuit; and
   (B) a lens barrel couplable to the camera body and including:
   (a) a terminal to be connected to the terminal of the camera body when the lens is mounted on the camera body;
   (b) a series to parallel converting circuit for converting the output of the parallel to series converting circuit input serially through the terminal into a digital signal; and
   (c) a diaphragm device having a solid state member and a plurality of electrode members, said solid state member being arranged for changing light shading characteristics when an electrical signal is applied to the electrode members, said diaphragm device further including a selecting circuit for selecting predetermined electrode members in accordance with a digital signal converted by the converting circuit so as to apply the electrical signal to the selected electrode members.

4. A camera system for controlling the aperture value of the lens by transmitting the aperture signal from the camera body to the mounted lens comprising:

(A) a camera body including:
 (a) an aperture information signal forming circuit, said circuit forming an electrical analogue signal corresponding to an aperture value;
 (b) an A-D converter for converting the analogue signal to a digital value;
 (c) latch means for latching an output of the A-D converter in response to a release operation;
 (d) a terminal for transmitting the digital value latched by the latch means out of the camera body; and
(B) a lens barrel couplable to the camera body and including:
 (a) a terminal to be connected to the terminal of the camera body when the lens is coupled to the camera body;
 (b) a diaphragm device having a solid state member and a plurality of electrode members, said solid state member being arranged for changing light shading characteristics when an electrical signal is applied to the electrode members, said diaphragm device further including a selecting circuit for selecting predetermined electrode members in accordance with the digital value from the terminal so as to apply an electrical signal to the selected electrode members.

5. A camera system according to claim 3, in which a release operation is performed, release means in the camera body and operated by a stroke of the release means, and the A-D converter is made operative by a step of a release stroke of the release means while the latch means and the parallel-series converting circuit are made operative by a second step in the stroke of the release means.

6. A camera system according to claim 4, in which the A-D converter is made operative by a first step in a stroke of the release means while the latch means is made operative by a second step in a stroke of the release means.

7. A camera system comprising:
(A) a camera body including:
 (a) an aperture information forming circuit for forming an analogue signal representing an aperture value;
 (b) an A-D converting circuit for converting the analogue signal to a digital value;
 (c) transmitting means for transmitting a digital value of the A-D converting circuit in response to a release operation;
 (d) control signal forming means for forming a control signal after completion of transmission by the transmitting means; and
(B) a lens barrel couplable to the camera body and including:
 (a) converter means to be connected to the transmitting means of the camera when the lens barrel is coupled to the camera body;
 (b) memory means for memorizing the digital value transmitted by the converter means;
 (c) a diaphragm device having a solid state member and a plurality of electrode members, said solid state member being arranged for changing light shading characteristics when an electrical signal is applied to the electrode members;

said diaphragm device including a selecting circuit for selecting predetermined electrode members in accordance with the digital value memorized in the memory means so as to apply an electrical signal to the selected electrode members; and
 (d) means for making the diaphragm device operative in response to the control signal from the control signal forming means.

8. A lens barrel attachable to a camera having diaphragm signal forming means which forms a diaphragm signal when supplied with power by operation of a power source switch, and an output terminal which produces the diaphragm signal, said lens barrel comprising:
 (a) an input terminal connectable to the output terminal;
 (b) a diaphragm device having a solid state member and an electrode for applying an electrical signal to the solid state member in accordance with the diaphragm value from the input terminal, said solid state member exhibiting light shading characteristics in correspondence to the diaphragm signal;
 (c) a power source;
 (d) a second input terminal to which a signal from the power source switch is applied; and
 (e) power supply means for supplying power to the diaphragm device by connecting a power source to the device in response to the signal from the second input terminal.

* * * * *